(No Model.)
J. J., G. H. & F. V. SWEATT.
SEED DRILL.
No. 313,250. Patented Mar. 3, 1885.
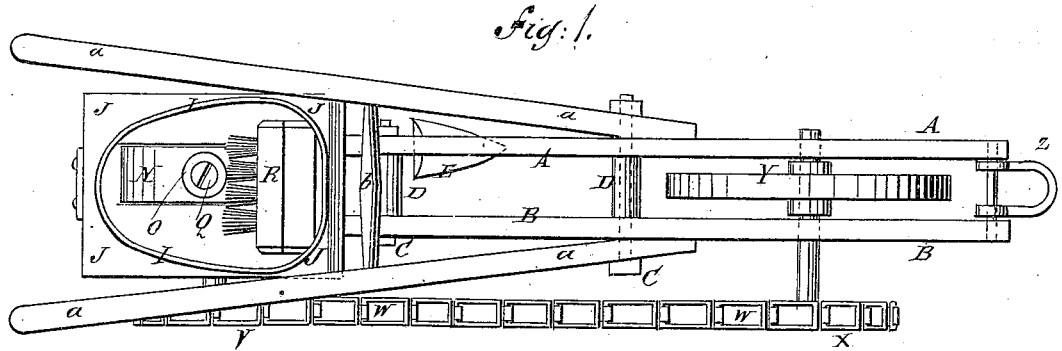
Fig. 1.
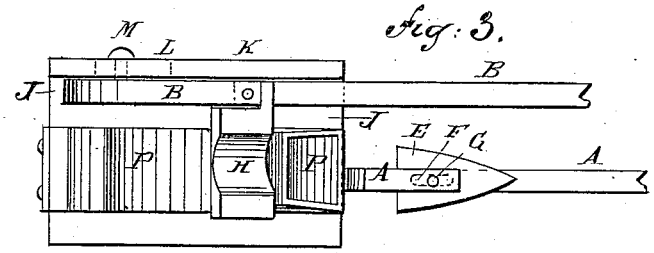
Fig. 3.
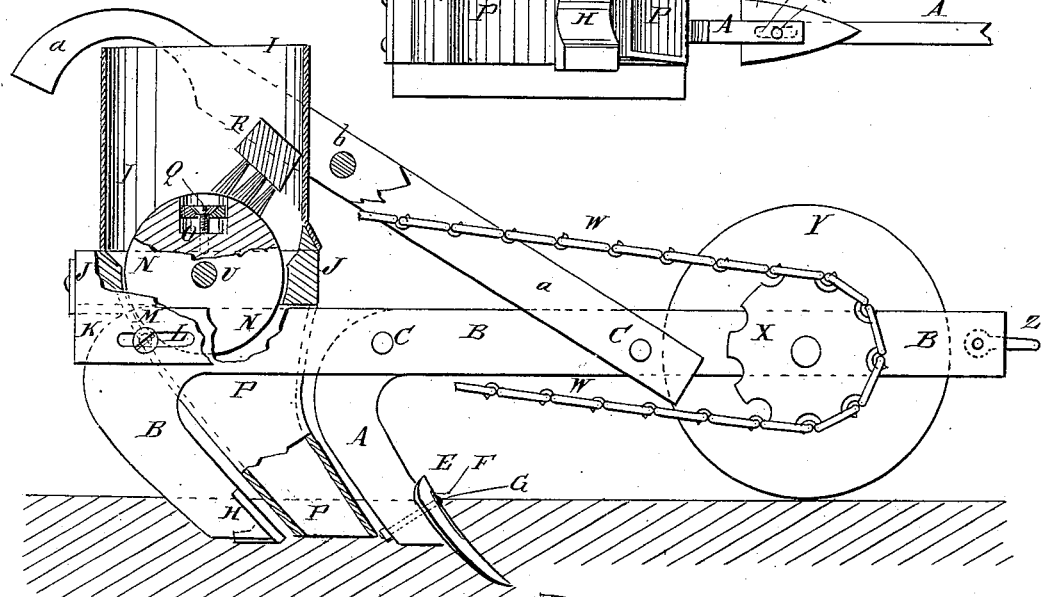
Fig. 2.
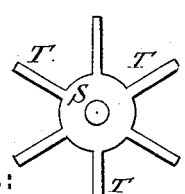
Fig. 5.
Fig. 4.
WITNESSES:
Chas. Nieta
Chas. Turcott
INVENTOR:
James J. Sweatt
George H. Sweatt
Francis V. Sweatt
BY Munn & Co.
ATTORNEYS.

UNITED STATES PATENT OFFICE.

JAMES J. SWEATT, GEORGE H. SWEATT, AND FRANCIS V. SWEATT, OF CONYERSVILLE, TENNESSEE.

SEED-DRILL.

SPECIFICATION forming part of Letters Patent No. 313,250, dated March 3, 1885.

Application filed September 12, 1884. (No model.)

*To all whom it may concern:*

Be it known that we, JAMES J. SWEATT, GEORGE H. SWEATT, and FRANCIS V. SWEATT, of Conyersville, in the county of Henry and State of Tennessee, have invented a new and useful Improvement in Seed-Drills, of which the following is a full, clear, and exact description.

Reference is to be had to the accompanying drawings, forming part of this specification, in which similar letters of reference indicate corresponding parts in all the figures.

Figure 1 is a plan view of one of our improved seed-drills. Fig. 2 is a side elevation of the same, partly in section. Fig. 3 is an under side view of the rear part of the drill. Fig. 4 is a rear elevation of the drill, part being broken away. Fig. 5 is a side elevation of a feed-wheel for planting cotton-seed.

The object of this invention is to provide machines for planting seeds in drills, which shall be simple in construction, convenient in use, and reliable in operation, planting the seeds regularly, and in uniform quantities.

The invention consists of the combinations of parts and their construction, substantially as hereinafter fully set forth and claimed.

A B are two parallel plow-beams, which are connected by bolts C, and are kept at the proper distance apart by tubular washers D, placed between them upon the said bolts. The beams A B are made of different lengths, so that their downwardly-curved rear ends may be at the proper distance apart longitudinally with the machine. To the rear end of the shorter beam, A, is attached a plow, E, to open a furrow to receive the seed, and which has a slot, F, formed in it to receive the fastening-bolt G, so that the said plow can be adjusted higher or lower by loosening the said bolt. To the rear end of the longer beam, B, is attached a block or plow, H, to cover the seed.

I is the seed-box, which is attached to a plate or platform, J. The platform J is placed upon the rear part of the longer beam, B, and is provided with a downwardly-projecting flange, K, which has a slot, L, formed in it to receive the bolt M, that secures the said platform to the said beam, so that by loosening the said bolt the said platform can be moved back or forward, to tighten or slacken the endless driving-chain, hereinafter described. The platform J is slotted to receive the seed-dropping wheel N, which has recesses O in its face to receive the seed and drop it into the spout P, through which the said seed passes to the ground. The spout P has a wide upper end, to receive the lower part of the wheel N. It is attached to the lower side of the platform J, and is so formed as to conduct the seed into the furrow close to the furrow-opening plow E.

Wheels N, with different-sized recesses O, are used for different kinds of seeds, and the amount of seed dropped at a time is regulated by screws Q, screwed into the wheel N in the bottoms of the recesses O. The seed-dropping wheel N is kept from carrying out any more seed than enough to fill the recesses O by a brush, R, or other suitable cut-off, attached to the seed-box I in such a position as to bear against the upper forward part of the said wheel N.

For planting cotton-seed, the wheel N is detached and replaced by a wheel, S, provided with radial arms T, by which the cotton-seeds are forced out of the seed-box I. The seed-dropping wheel N is attached to a shaft, U, which passes through a bearing in the platform J, and to its outer end is attached a chain-wheel, V. Around the chain-wheel V passes an endless chain, W, which also passes around a chain-wheel, X, attached to the projecting end of a journal of the drive-wheel Y, placed between and journaled to the forward parts of the beams A B, so that the seed-dropping wheel will be driven by the revolution of the said wheel X.

To the forward ends of the beams A B is attached a clevis, Z, to receive the draft. The forward ends of the handles *a* are secured to the beams A B by the forward bolt, C, and are connected at their middle parts by a round, *b*, to keep them in proper relative positions.

Having thus fully described our invention, we claim as new and desire to secure by Letters Patent—

In a seed-drill, the combination, with the seed-box I, the seed-dropping wheel N, the plow-beam B, and the chain and chain-wheels W V X, of the platform J, having slotted flange K, and the bolt M, carrying the pendent beam B, provided with a laterally-projecting coverer disposed in rear of the spout P, substantially as herein shown and described.

JAMES J. SWEATT.
GEORGE H. SWEATT.
FRANCIS V. SWEATT.

Witnesses:
SALLIE CRANK,
J. L. CRANK.